US008941960B2

(12) United States Patent
Murray

(10) Patent No.: US 8,941,960 B2
(45) Date of Patent: Jan. 27, 2015

(54) ELECTRICAL SWITCHING APPARATUS

(75) Inventor: David Russell Murray, Manly (AU)

(73) Assignee: Siemens Ltd., Bayswater, Victoria (AU)

( * ) Notice: Subject to any disclaimer, the term of this patent is extended or adjusted under 35 U.S.C. 154(b) by 950 days.

(21) Appl. No.: 13/125,024

(22) PCT Filed: Oct. 20, 2009

(86) PCT No.: PCT/AU2009/001382
§ 371 (c)(1),
(2), (4) Date: Jun. 1, 2011

(87) PCT Pub. No.: WO2010/045678
PCT Pub. Date: Apr. 29, 2010

(65) Prior Publication Data

US 2012/0049995 A1 Mar. 1, 2012

(30) Foreign Application Priority Data

Oct. 22, 2008 (AU) ................................ 2008905454

(51) Int. Cl.
*H02H 3/00* (2006.01)
*H01H 75/06* (2006.01)
*H01H 75/04* (2006.01)
*H01H 33/666* (2006.01)

(52) U.S. Cl.
CPC ............... *H01H 75/06* (2013.01); *H01H 75/04* (2013.01); *H01H 33/666* (2013.01)
USPC ............................................... 361/71; 361/72

(58) Field of Classification Search
USPC ................................................ 361/42, 71, 72
See application file for complete search history.

(56) References Cited

U.S. PATENT DOCUMENTS

| | | | | |
|---|---|---|---|---|
| 2,353,470 A | 9/1944 | Ileman | | |
| 2,414,786 A | 1/1947 | Lincks et al. | | |
| 2,506,744 A | 5/1950 | Schindler et al. | | |
| 2,524,525 A | 10/1950 | Hermann et al. | | |
| 4,323,871 A | 4/1982 | Kamp et al. | | |
| 5,103,364 A | 4/1992 | Kamp | | |
| 6,667,866 B1 * | 12/2003 | LaPlace et al. | ................. | 361/87 |
| 6,852,939 B2 * | 2/2005 | Rhein et al. | ................... | 218/154 |
| 6,972,936 B2 * | 12/2005 | Morris | ............................ | 361/42 |

FOREIGN PATENT DOCUMENTS

EP 0901142 B1 2/2007

* cited by examiner

*Primary Examiner* — Danny Nguyen

(74) *Attorney, Agent, or Firm* — Laurence A. Greenberg; Werner H. Stemer; Ralph E. Locher

(57) ABSTRACT

A switching apparatus for use in conjunction with a fuse, the switching apparatus including a circuit interrupter having a pair of separable contacts, a sensor for sensing a line fault, and an actuator for moving the contacts to an open state when a line fault is sensed, and wherein the switching apparatus is arranged such that the contacts always return to a closed state.

29 Claims, 11 Drawing Sheets

ELECTRICAL SWITCHING APPARATUS

CROSS-REFERENCE TO RELATED APPLICATIONS

This is a US national phase application based on International Application PCT/AU2009/001382, filed Oct. 20, 2009, which claims the benefit of AU Application 2008905454, filed Oct. 22, 2008.

BACKGROUND OF THE INVENTION

The present invention relates to an electrical switching apparatus, and in particular to a switching apparatus that operates in conjunction with a fuse.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Overcurrent protection of electrical distribution networks is usually achieved by a combination of fuses and circuit breakers. In overhead networks a significant problem is that many faults are transient, such as a lightning strike flashing over an insulator, a bird shorting across two lines, wind causing conductors to swing and touch. Whilst the cause of the fault itself is momentary the arc that it initiates is sustained by the fault current which then flows and which will damage the network. Interrupting the supply causes the arc to extinguish and the fault to be cleared so that when the supply is restored the line is no longer faulted.

In practice, overhead networks may be protected by switchgear which has the ability to trip on overcurrent and then to automatically restore power after a brief interval and to trip again only if the fault is still present (because the fault is permanent rather than transient). The trip-wait-close sequence is called an auto-reclose and will automatically clear transient faults. The auto-reclose functionality is achieved by use of protection relays and circuit breakers in sub-stations and also by special purpose switchgear called auto-reclosers which are installed at appropriate points on the electrical network.

However auto-reclosers are expensive to purchase, install and maintain so that their use is normally limited to the main sections of the electrical supply network. Sub-sections of the supply network are often protected by fuses which have no auto-reclose capability. This means that faults on fuse protected sections will blow the fuse and supply will be lost to the customers until a line repair crew finds the fuse and replaces it.

In situations in which a fuse is used, the fuse will blow in the event of a transient fault, resulting in a loss in power until the fuse is replaced.

SUMMARY OF THE PRESENT INVENTION

The present invention seeks to substantially overcome, or at least ameliorate, one or more disadvantages of existing arrangements.

In a first broad form the present invention seeks to provide a switching apparatus for use in conjunction with a fuse including:

a circuit interrupter having a pair of separable contacts;

a sensor for sensing a line fault; and, an actuator for moving the contacts to an open state when a line fault is sensed, and wherein the switching apparatus is arranged such that the contacts always return to a closed state.

Typically the contacts return to the closed state after a first time period.

Typically the switching apparatus is arranged so that the actuator will only open and close the contacts a single time after which the switching apparatus will not cause the actuator to move the contacts to the open state for a second time period.

Typically the switching apparatus is arranged so that the actuator will only open and close the contacts a single time after which the switching apparatus will not cause the actuator to move the contacts to the open state whilst the line fault is still sensed.

Typically the switching apparatus is arranged so that if the line fault persists after the contacts return to the closed state, the switching apparatus causes the actuator to open and close the contacts at least once more.

Typically the switching apparatus is arranged so that the actuator will only open and close the contacts a predetermined number of times after which the switching apparatus will not cause the actuator to move the contacts to the open state for a second time period.

Typically the switching apparatus is arranged so that the actuator will only open and close the contacts a predetermined number of times after which the switching apparatus will not cause the actuator to move the contacts to the open state whilst the line fault is still sensed.

Typically the contacts return to the closed state autonomously.

Typically the contacts return to the closed state without external intervention.

Typically the switching apparatus includes only transient open states.

Typically the sensor is a current sensor and wherein a line fault is sensed if a line current rises above a predetermined level.

Typically the actuator is powered by a capacitor.

Typically the circuit interrupter is a vacuum interrupter.

Typically the actuator is for returning the contacts to the closed state.

Typically the switching apparatus includes a controller for controlling the actuator.

Typically the actuator includes:

a first biasing mechanism for biasing the contacts towards the closed state; and, a second biasing mechanism for biasing the contacts towards the open state; and wherein the controller is for selectively controlling at least one of the biasing mechanisms to thereby cause the contacts to move between the closed and open states.

Typically at least one of the biasing mechanisms includes at least one of:

a spring;

a resilient member; and a magnet.

Typically the first biasing mechanism includes a magnet for biasing the contacts towards the closed state, and wherein the second biasing mechanism includes a spring for biasing the contacts towards the open state.

Typically the actuator includes an armature coupled to one of the contacts for moving the contacts between the closed and open states.

Typically the actuator includes an electromagnet for modifying a magnetic attraction between the armature and the magnet, and wherein the controller is for selectively controlling a current applied to the electromagnet to thereby cause the contacts to move between the closed and open states.

Typically the first and second biasing mechanisms provide respective biasing forces in opposing directions, and wherein the controller controls the relative magnitude of the biasing forces to thereby selectively move the contacts between the open and closed positions.

Typically the actuator is an electromechanical escapement.

Typically the electromechanical escapement includes:

a double-toothed pawl pivotally movable between first and second positions;

a spiral spring-loaded, single-toothed wheel mounted to an axle, to allow rotation of the wheel such that the tooth engages a first pawl tooth when the pawl is in the first position and a second pawl tooth, when the pawl is in the second position;

a crank having a first end coupled to one of the contacts and a second end pivotally mounted to the wheel such that the contacts are closed when the pawl is in the first position, and open when the pawl is in the second position;

a spring for biasing the pawl into the first position; and, a solenoid coupled to the pawl, wherein energising the solenoid biases the pawl into the second position.

Typically the switching apparatus includes a controller for selectively energising the solenoid to thereby cause the contacts to open.

Typically a number of times that the switching apparatus opens the contacts and returns the contacts to the closed state is based at least in part on the initial spring loading of the wheel.

Typically the controller is a programmable microprocessor.

Typically the sensor is a current transformer connected to the current path.

Typically at least the actuator is powered by the current transformer.

Typically, during the first time period, at least the actuator is powered by a capacitor charged by the current transformer.

Typically the controller is powered by a current transformer.

Typically the apparatus includes a circuit interrupter, actuator, controller, sensor and power supply integrated into an enclosure.

Typically the switching apparatus is placed in series with a fuse in use.

In a second broad form the present invention seeks to provide a switching system including a switching apparatus of the first broad form of the invention in series with a fuse.

In a third broad form the present invention seeks to provide a switching apparatus for use in conjunction with a fuse including:

a circuit interrupter having a pair of separable contacts;

a sensor for sensing a line fault; and, an actuator for moving the contacts to an open state when a line fault is sensed, and wherein the switching apparatus is arranged such that the contacts always return to a closed state without external intervention.

In a fourth broad form the present invention seeks to provide a switching apparatus for use in conjunction with a fuse including:

a circuit interrupter having a pair of separable contacts;

a sensor for sensing a line fault; and, an actuator for moving the contacts to an open state when a line fault is sensed, and wherein the switching apparatus is arranged such that the contacts have no stable open state.

BRIEF DESCRIPTION OF THE DRAWINGS

An example of the present invention will now be described with reference to the accompanying drawings, in which.

DETAILED DESCRIPTION OF THE PREFERRED EMBODIMENTS

Figure 1:
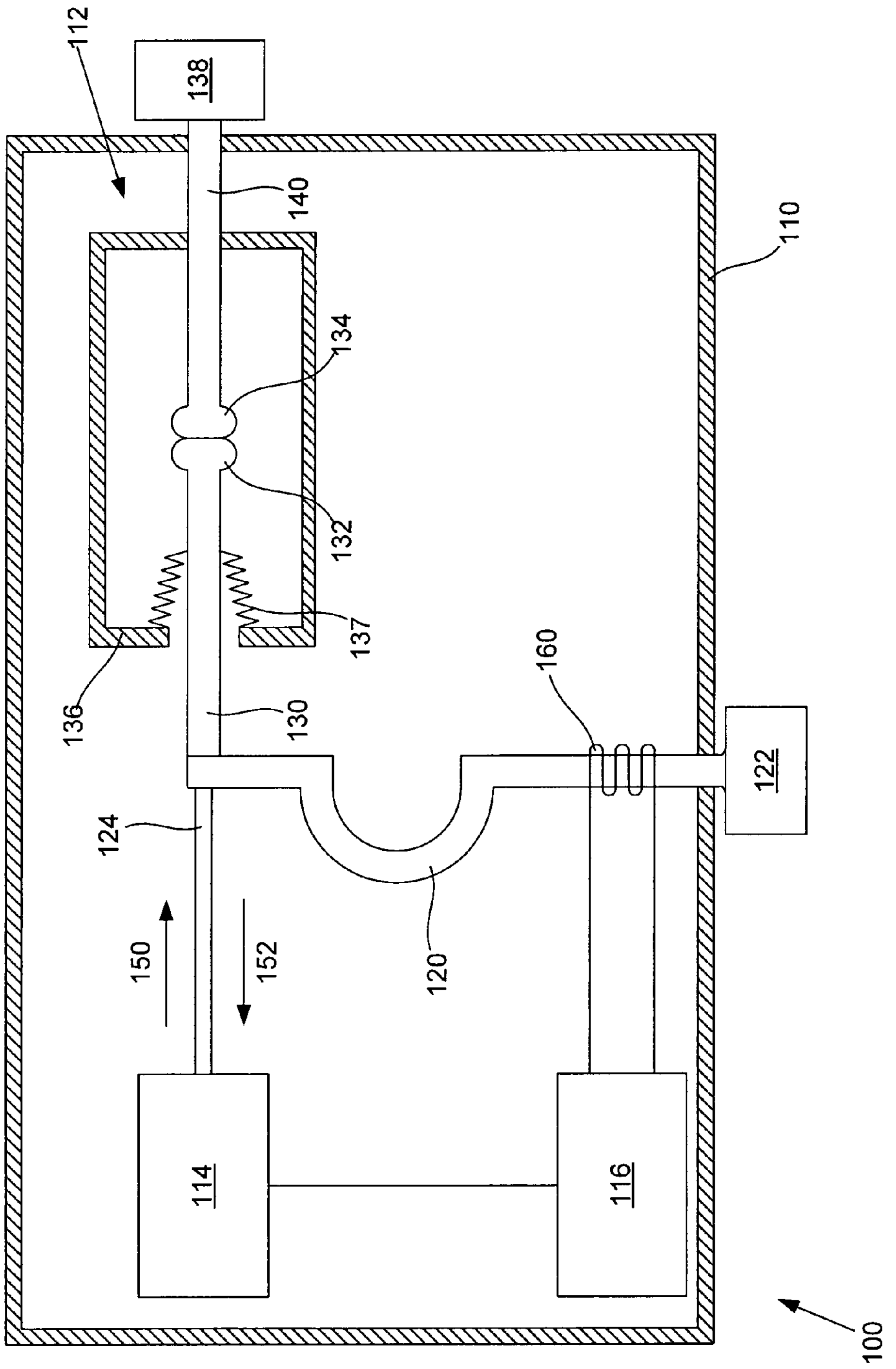
FIG. 1 is a schematic diagram of an example of an electrical switching apparatus.

An example of an electrical switching apparatus will now be described with reference to FIG. 1.

In this example, the switching apparatus 100 comprises a circuit interrupter 112 with a fixed terminal 140 and a moving terminal 130, an actuator 114, a controller 116 and a sensor 160, integrated into an enclosure 110 which has external electrical terminals 122, 138 for a source and a load. Either terminal may be connected to the source or the load.

Circuit interrupter fixed terminal 140 is electrically connected to external terminal 138, and circuit interrupter moving terminal 130 is electrically connected to external terminal 122 by a flexible conductor 120. Circuit interrupter moving terminal 130 is mechanically coupled to actuator 114 by pushrod 124.

The circuit interrupter 112 is, for example, a vacuum interrupter having a pair of separable contacts 132, 134 disposed in a vacuum bottle 136. Contact 134 is situated on the end of fixed terminal 140, and contact 132 is situated on the end of moving terminal 130. Vacuum is retained around the moving terminal by metal bellows 137. Moving terminal 130 is connected to the pushrod 124, allowing it to be moved in the direction of arrow 152 by actuator 114, thereby separating the contacts 132, 134 or in the direction of arrow 150 thereby closing the contacts 132, 134.

The switching apparatus 100 also typically includes a sensor 160, which is coupled to the controller 116. The sensor 160 allows an indication of current flow through the device between external terminals 122 and 138 to be determined by the controller.

In use, the actuator 114 biases pushrod 124 in the direction of arrow 150, so that the contact 132 is urged against the contact 134, thereby making the electrical circuit and allowing current flow between the source and load terminals 122, 138. This situation is referred to as a closed position, or closed state.

In the event that an overcurrent, or other similar fault, is detected by the controller 116, the controller 116 activates the actuator 114, causing the pushrod 124 to be moved in the direction of arrow 152. This separates the contacts 132, 134, thereby disconnecting the supply terminal 122 from the load terminal 138, interrupting current flow on the line. This situation is referred to as an open position, or an open state.

In use, the switching apparatus 100 is adapted to return to the closed position a first period of time after the contacts have been opened and this may be achieved using suitable configuration of the actuator 114, or the controller 116. This first time period when the apparatus is open is called the dead time. The switching apparatus 100 is then configured to remain in the closed position for at least a second period of time before the apparatus is able to perform further switching. Alternatively or additionally the switching apparatus 100 is configured to remain in the closed position until the overcurrent or similar fault has been cleared by some other apparatus.

In this example, and as will be described in more detail below, the apparatus 100 is configured so that it always returns the interrupter 112 to the closed position, this is referred to as a normally closed arrangement. This is typically achieved using a biasing means, such as a resilient member, spring, or a suitably programmed controller or the like.

In this situation, the switching apparatus can be considered to have no stable open state, in that the switching apparatus only has transient open states which clear themselves without external intervention. As a result, the switching apparatus will always return to a closed state after a pre-determined delay. This is in direct contrast to conventional switchgear which can reach a stable open state via a number of pathways such as “automatically tripping to lockout” or an operator opening the switchgear manually. In these cases the conventional switchgear achieves a stable open state and will remain in that state until an external intervention by a human being or a supervisory control system which will command it closed.

Figure 2:
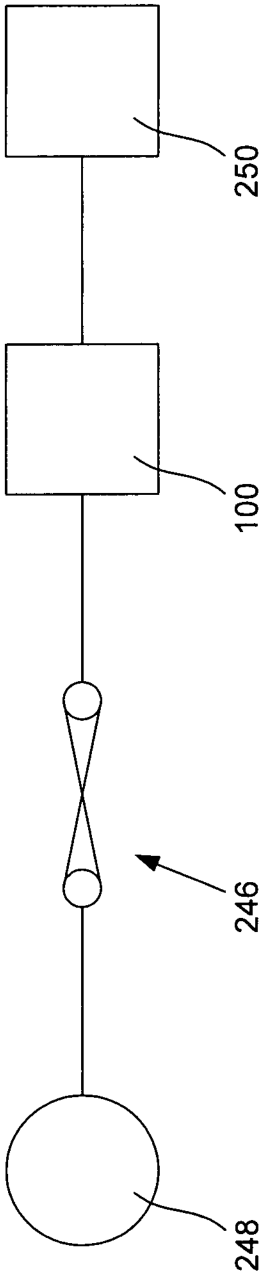
FIG. 2 is a schematic diagram of an example of a fuse-saving installation of the electrical switching apparatus of FIG. 1.

FIG. 2 illustrates an example of a fuse-saving installation of the switching apparatus 100 in an overhead power distribution circuit.

In this example, the switching apparatus 100 is connected in series with a fuse 246 between a source 248 and a load 250. The fuse 246 is, for example, a drop-down expulsion fuse.

In use, switching apparatus 100 determines a line overcurrent condition and opens the contacts 132, 134, interrupting the line current before the fuse 246 operates. The line overcurrent condition is typically determined when the line current sensed by the sensor 160 exceeds a predetermined level, or a predetermined rate of rise. The predetermined level is, for example, the current rating of the fuse 246. The predetermined rate of rise is, for example, related to the frequency of the power system and the current rating of the fuse.

After a predetermined first time period, referred to as a dead time, the switching apparatus 100 closes the contacts 132, 134, restoring the line current. If the line fault is still present when the contacts close the line overcurrent will start again. However, following return of the contacts 132, 134 to the closed state, the apparatus is configured to not open the contacts 132, 134 for at least a second time period, typically 30 seconds, or not to open the contacts whilst the fault condition is still present, and so allowing the fault current to persist for sufficient time to operate the fuse 246, and clear the fault. Thus, if the line fault is not present when the contacts 132, 134 return to the closed state the line current will remain below the fault current level and after the second period of time the switching apparatus will return to its quiescent state monitoring the line current for a new fault.

Accordingly, the above described switching apparatus can be used to prevent the fuse 246 from blowing when a transient line overcurrent fault is initiated on a live line.

If the fault was not transient then when the device returns the contacts 132, 134 to the closed state the line overcurrent returns and blows the fuse thus clearing the fault from the network and disconnecting the faulted section until a utility technician finds and repairs the fault and replaces the fuse. In this way the switching apparatus operates automatically to increase the supply reliability for the consumer and reduce the number of times the utility technician has to replace fuses.

Thus, the above described switching apparatus increases the reliability of the network by preventing fuses from blowing under transient fault conditions, whilst providing a low cost arrangement making its installation cost effective for providing protection of fuses.

In some scenarios a line fault may persist after the contacts 132, 134 return to the closed state but the line fault may still be transient in nature. In these cases it may be desirable for the switching apparatus 100 to cause the actuator 114 to open and close the contacts 132, 134 at least once more before arriving at the stable closed state to provide an additional opportunity for a transient line fault to clear before the fuse is blown.

It may also be desirable for the contacts 132, 134 to open and close several times before the fuse is allowed to blow, and therefore the switching apparatus may be configured to cause the contacts to open and close a predetermined number of times if the line fault persists, after which the switching apparatus will not cause the actuator to move the contacts to the open state for a second time period to finally allow the fuse to blow if the line fault has not cleared.

A specific example of a switching apparatus 100 will now be described in more detail.

Figure 3:
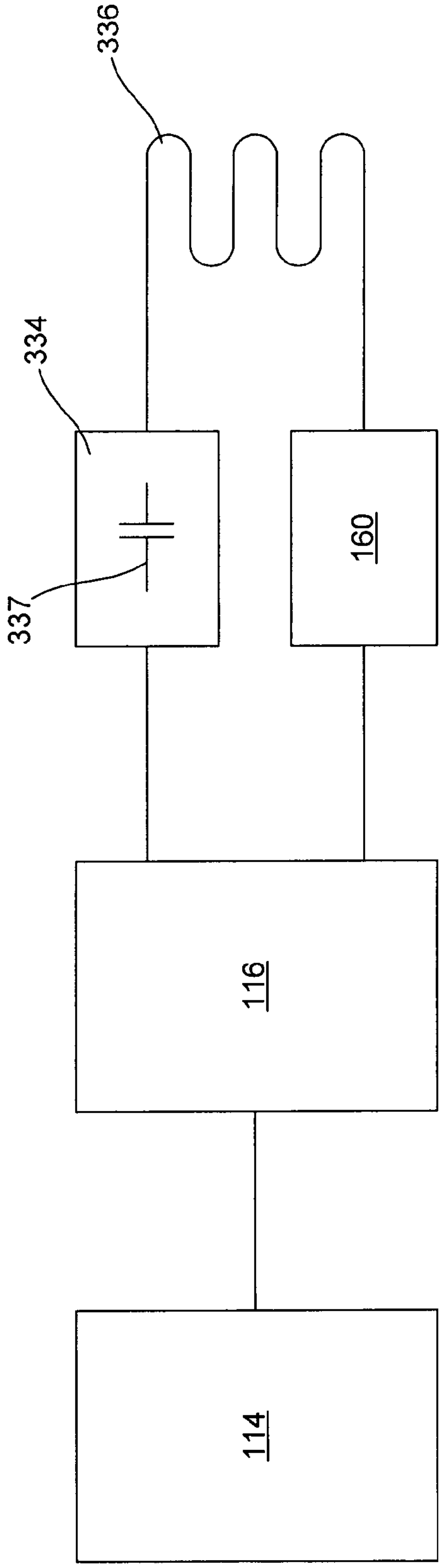
FIG. 3 is a schematic diagram of an example of a controller, sensor and power supply for the electrical switching apparatus of FIG. 1.

Referring to FIG. 3, the controller 116 is, for example, a programmable microprocessor powered by a power supply 334. The power supply 334, for example includes a capacitor 337 to provide power during dead time between opening and reclosing of the contacts 132, 134, the capacitor 337 being charged by the current transformer 336. The sensor 160 is, for example, provided by current measuring circuits driven by the current transformer 336.

Figure 4:
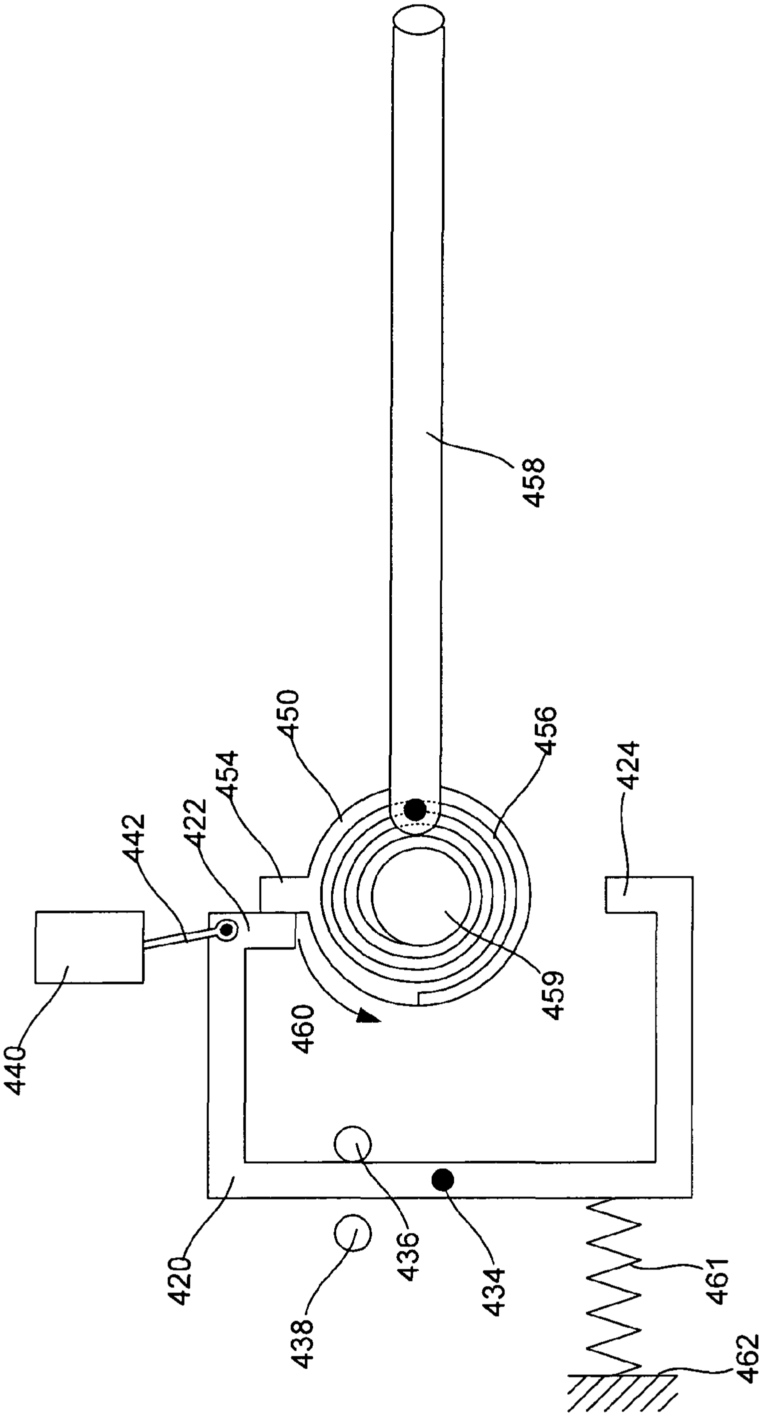
FIGS. 4 and 5 are schematic diagrams of an example of the actuator of the electrical switching apparatus of FIG. 1.
Figure 5:
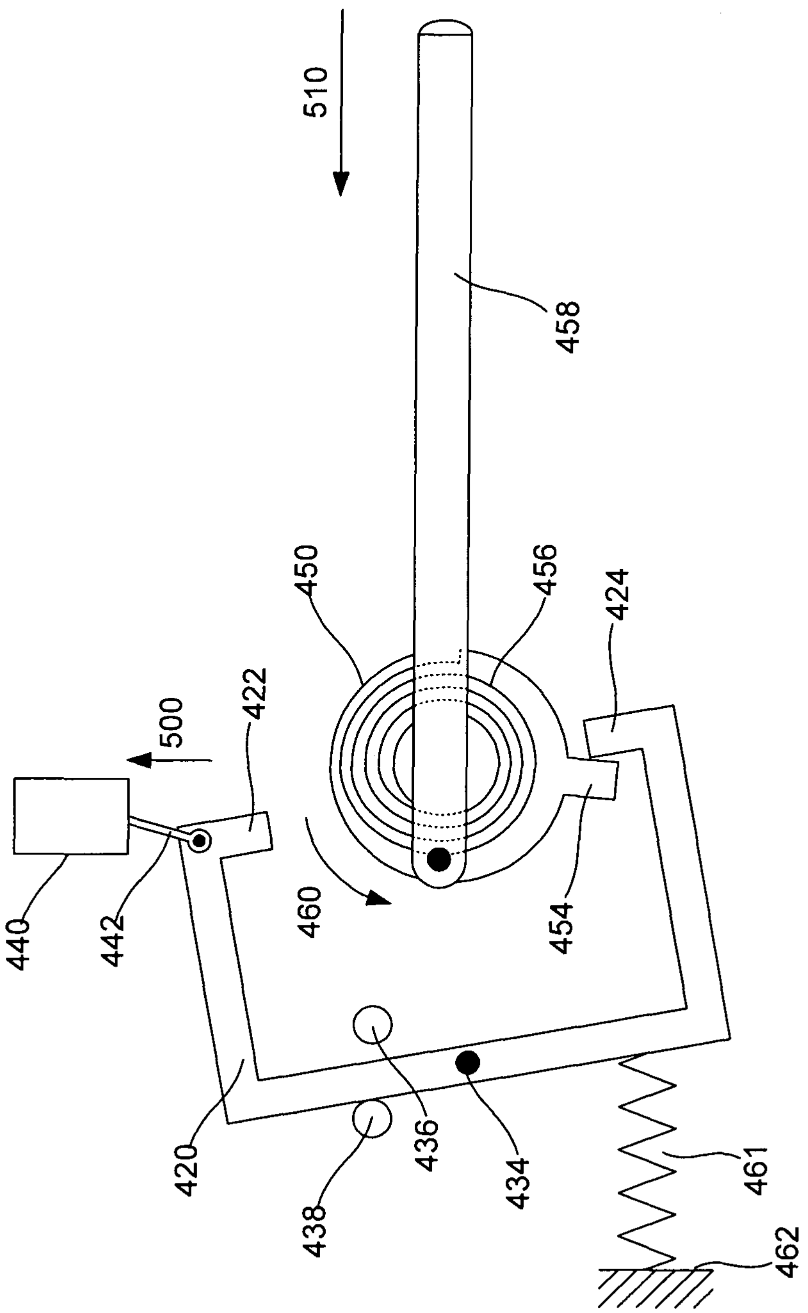

Referring to FIGS. 4 and 5, the actuator 114 is, for example, an electromagnetic escapement having a double-toothed pawl 420, having teeth 422, 424, that is supported by a pivot 434, to allow pivotal movement between two stops 436, 438. The pawl 420 is coupled to a solenoid 440, via a solenoid arm 442, allowing movement of the pawl to be controlled by the solenoid 440 and spring 461, which is coupled to the pawl 420 and a support 462, such as the enclosure 110, to thereby urge the pawl 420 against stop 436. A wheel 450, having a single tooth 454 is rotatably mounted to a fixed shaft 459. The wheel includes a loaded spiral spring 456, which urges the wheel 450 in the direction of arrow 460 using shaft 459 to provide reaction force for the spring. The wheel 450 is pivotally connected to one end of a crank 458, which typically forms all or part of, or is connected to, the pushrod 124.

In use, the controller 116 controls the actuator 114 by selectively energising and de-energising the solenoid 440 to transform the regulated, spring-driven rotation of the wheel 450 into reciprocal linear movement of the crank 458 that alternately opens and closes the contacts 132, 134. The number of consecutive closes of the contacts 132, 134 is based at least in part on the initial winding of spring 456, which may be set for example during manufacture. A means such as an electric motor (not shown) can rewind the spring between closing operations by rotating shaft 459, or alternatively the controller 116 can be arranged to not activate the actuator 114 in the event that the spring does not have sufficient loading to return the contacts to the closed position.

FIG. 4 illustrates the actuator 114 in the normally closed state. In this arrangement, the pawl 420 abuts against the stop 436 so that the pawl 420 is in a first position in which the pawl tooth 422 engages the tooth 454, retaining the wheel 450 and the crank 458 in the position shown. In this situation, the crank 458 and pushrod 124 are arranged so that the contacts 132, 134 are connected, and hence are in the closed position. In this example, the normally closed state occurs when the solenoid is de-energised, so that the default position is for the contacts 132, 134 to remain in the closed position, thereby ensuring the switching apparatus 100 is normally closed.

FIG. 5 illustrates the actuator 114 after the controller 116 energises the solenoid 440 moving the solenoid arm 442 in the direction of arrow 500, so that the pawl 420 rotates into a second position abutting against the stop 438, releasing the tooth 454 from engagement with the pawl tooth 422. The wheel 450 rotates through approximately 180° until the tooth 454 abuts the pawl tooth 424, thereby preventing further rotation of the wheel 450. In this situation, the crank 458 is moved in the direction of arrow 510, causing the contacts 132, 134, to be disengaged, thereby placing the switching apparatus 100 in the open position.

In this example, it will be appreciated that when the solenoid 114 is de-energised, the pawl 420 and the solenoid 440 return to the position of FIG. 4 by the urging action of the spring 461. Consequently, the pawl 420 abuts against the stop 436, releasing the tooth 454, and allowing the wheel 450 to rotate through a further 180° until the tooth 454 again abuts the pawl tooth 422, thereby preventing further rotation of the wheel 450. Consequently, the crank 458 returns to the original position, closing the contacts 132, 134.

Energising and de-energising the solenoid 440 can be achieved in any one of a number of manners. Thus, for example, the controller 116 can couple the solenoid 440 to the power supply 334 to energise the solenoid 440, and then disconnect the solenoid 440 to allow de-energising. In this instance, the dead time is controlled by the controller 116. Additionally the controller 116 is programmed so that, following a close solenoid 440 will not be energised for a second period of time, typically 30 seconds, giving time for the fuse to operate in the event that the line fault was not cleared by the interruption. Also the controller may be programmed not to close the contacts a second time until the line has been fault-free for the second time period.

Alternatively, if the power supply 334 is in the form of a capacitor 337, the solenoid 440 can be connected to the capacitor 337, which will then maintain the solenoid in an energised state for a time period, dependent on the charge stored therein. Following this, the solenoid automatically de-energises, returning the switching apparatus to the closed position. Thus, by powering the actuator 114 using a capacitor 337, this allows the dead time between the contacts opening and closing to be determined based on the storage characteristics of the capacitor 337. Furthermore since the charge in the capacitor 337 has been exhausted in the first operation of the solenoid there is no charge available to open the switching apparatus a second time in the event that the line fault was not cleared by the first interruption. This constitutes a simple form of controller.

An example of the operation of the electrical switching apparatus in service will now be described with reference to FIGS. 6 and 7.

Figure 6:
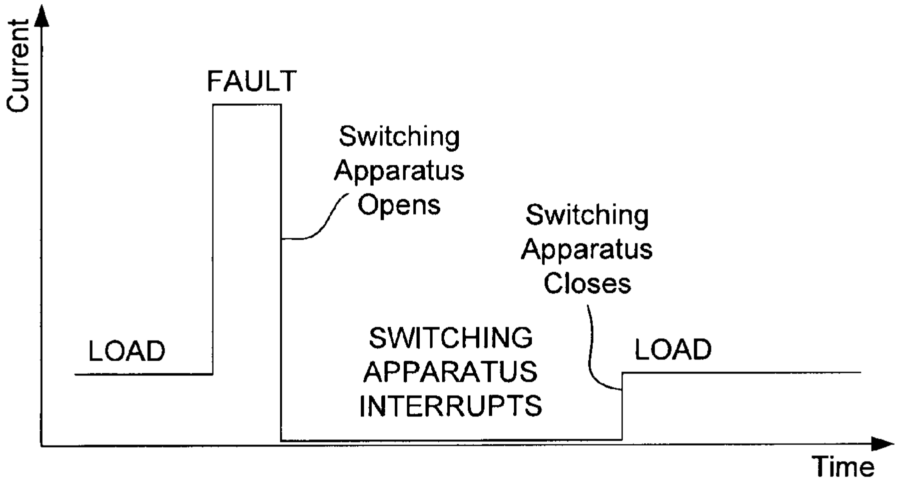
FIGS. 6 and 7 are current-time graphs of the operation of the electrical switching apparatus of FIG. 1 for transient and persistent overcurrents.

Referring to FIG. 6, many fault currents are transient and clear during the dead-time so that supply is restored when the switching apparatus 100 closes. The switching apparatus 100 therefore saves the fuse 246 from blowing under transient fault conditions which in turn prevents the supply from being lost and saves the utility the cost of sending a technician to replace fuse 246.

Figure 7:
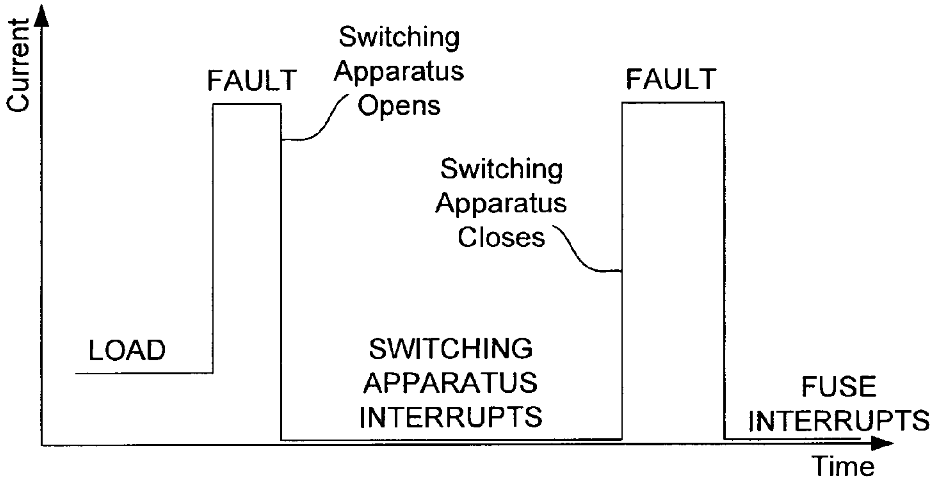

Referring to FIG. 7, if the fault is permanent and has not cleared during the dead time the switching apparatus 100 does not open a second time, thereby allowing the overcurrent to blow the fuse 246. This clears the fault from the power distribution network, and disconnects the faulted section until the fault is repaired and the fuse 246 is replaced.

The above described example is only one possible implementation of a normally closed switching apparatus, and a number of variations are possible.

For example in some situations it is desirable for the apparatus to trip (open) and close more than once to clear a fault before the apparatus closes and stays closed to allow the fuse to blow. This can be achieved by suitable programming or arrangement of the controller.

For example, other equivalent circuit interrupters may also be used, such as oil interrupters, sulphur hexafluoride ($SF_6$) interrupters, air interrupters, etc. Other equivalent actuators may also be used, for example, magnetic actuators, compressed gas actuators, pneumatic actuators, hydraulic actuators, etc. The invention may also be implemented with other equivalent sensors, such as Rogowski coils, Hall effect sensors, etc. Power may be supplied by other equivalent power supplies, for example, batteries, solar cells, etc. The switching apparatus can use algorithms to predict prospective line current and initiate current interruption.

In one example, the actuators are pre-charged upon manufacture, thereby allowing the device to perform the fuse-saving sequence a limited number of times during their working life. This can be achieved for example based on the pre-winding of the spiral spring in the example above, or by pre-charging a gas or pneumatic system with a predetermined supply of working fluid. In this example, the controller 116 is configured to ensure that there is sufficient actuator charge, such as loading on the spring 456, to ensure the contacts 132, 134 return to the closed position. In the event that insufficient spring loading is available, the contacts will remain closed and so allowing the fuse to operate if required, in this case the apparatus will need to be replaced. Alternatively, recharging of the operating spring or gas reservoir may occur automatically, for example, by providing a motor to coil the spring or pump the working fluid periodically or as required.

It will be appreciated that the above described actuator is for the purpose of example only and that in practice a wide range of different actuators could be used. For example, the actuator 114 can include a first biasing mechanism for biasing the contacts 132, 134 towards the closed state and a second biasing mechanism for biasing the contacts 132, 134 towards the open state. In this instance, the controller 116 can selectively control at least one of the biasing mechanisms to thereby cause the contacts 132, 134 to move between the closed and open states.

A range of different biasing mechanisms can be used, such as a spring, a resilient member or a magnet. For example, the first biasing mechanism may include a magnet for biasing the contacts towards the closed state, and the second biasing mechanism may include a spring for biasing the contacts towards the open state. In this example the actuator 114 may include an armature coupled to one of the contacts 132, 134 so that the contacts 132, 134 may be moved between the closed and open states when the armature is moved by the biasing mechanisms. An electromagnet may also be provided in the actuator 114 for modifying the magnetic attraction between the armature and the magnet, and the controller 116 may therefore cause the contacts 132, 134 to move between the closed and open states by selectively controlling a current applied to the electromagnet. In this example, the contacts 132, 134 are normally biased towards the closed state by the magnet, so that the switching apparatus 100 is normally closed.

In the above described example it will be appreciated that the first and second biasing mechanisms provide respective biasing forces in opposing directions and the controller 116 controls the relative magnitude of the biasing forces to thereby selectively move the contacts 132, 134 between the open and closed states. It will be apparent that there will be numerous possible implementations of switching apparatus 100 which operate under this general principle.

A detailed example of an alternative embodiment of the actuator 114 outlined above will now be described with reference to FIGS. 8 and 9, which show the actuator 114 in closed and open positions respectively. It will be appreciated that this example illustrates a specific implementation of the above described principle of controlling opposing biasing forces to open and close the contacts 132, 134.

In this example, the actuator 114 is a magnetic actuator for driving the contacts 132, 134 into the closed and open positions respectively. FIGS. 8 and 9 show cross-sectional views of the actuator 114, which is axially symmetric. The actuator 114 includes an end plate 601 fixed to an axially polarised toroidal permanent magnet 602 which is in turn fixed to yoke 603. The end plate 601 and yoke 603 are typically made of a ferromagnetic material. An armature 604, also typically made of a ferromagnetic material, is attracted to the end plate 601 by the magnetic field of the magnet 602.

Figure 8:
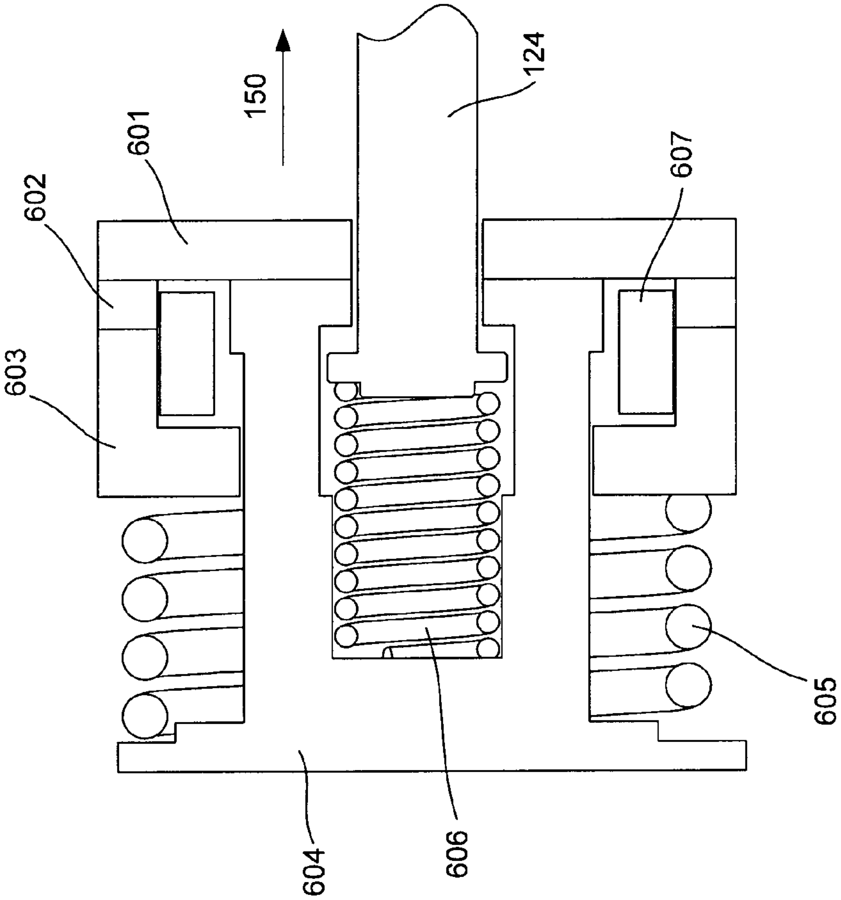
FIGS. 8 and 9 are cross-sectional schematic diagrams of an example of an alternative actuator.
Figure 9:
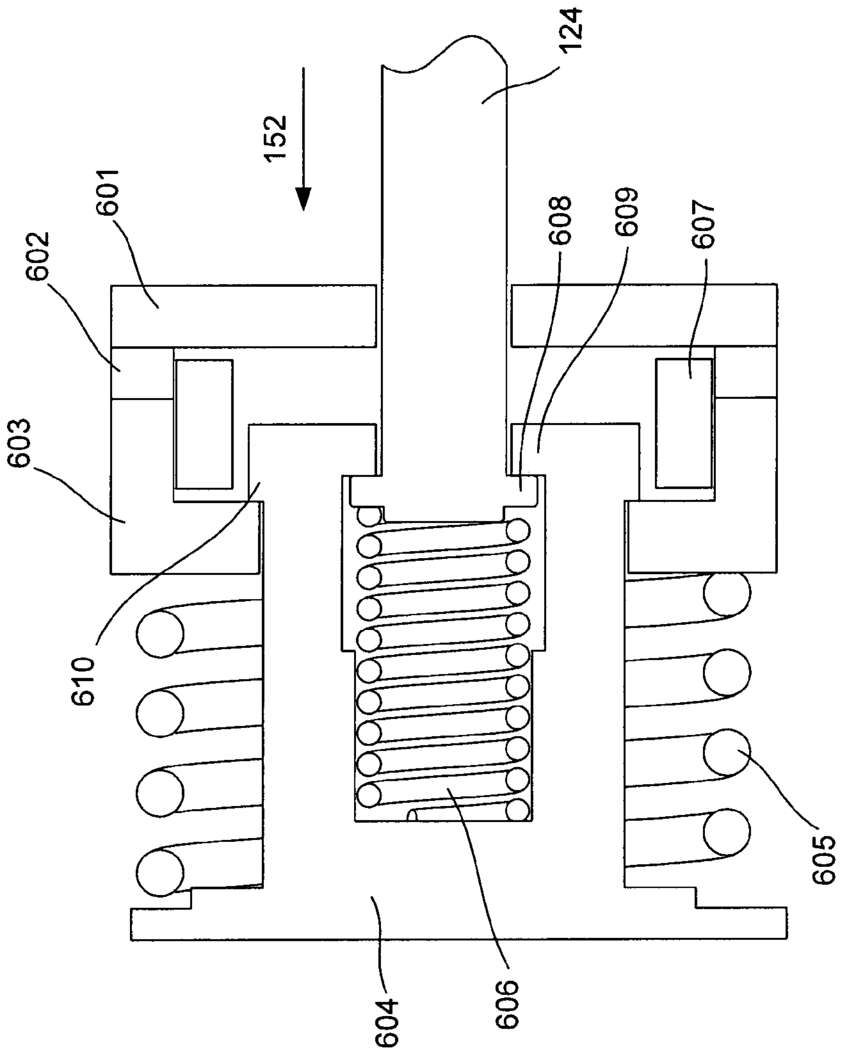

FIG. 8 shows the armature 604 held in contact with the end plate 601 by the magnetic field of the magnet 602, and in this case the actuator 114 is in the closed position, whereby a contact spring 606 provides a spring loaded force to urge the pushrod 124 in direction 150, urging the contacts 132, 134 closed. It will therefore be appreciated that the magnet 602 functions as the first biasing mechanism as described above.

An opening spring 605 acts to push the armature 604 away from the end plate 601, however, when the actuator is in the closed position as shown in FIG. 8, the spring force of the opening spring 605 is overcome by the magnetic force of the magnet 602 holding the armature 604 in contact with the end plate 601.

In order to open the actuator 114 from the closed position, a coil 607 is energised by the controller 116 with an electric current adapted to generate a second magnetic field with a first polarity arranged to oppose the magnetic field of the magnet 602. This acts to weaken the attraction of the armature 604 to the end plate 601 so that the opening spring 605 urges the armature 604 away from the end plate 601 and into the open position shown in FIG. 9. It will therefore be appreciated that the opening spring 605 functions as the second biasing mechanism.

When the actuator 114 is in the open position, the armature 604 is urged in direction 152 by the opening spring 605. An inner lip 608 on the armature 604 contacts a flange 609 on the pushrod 124, and the pushrod 124 is consequently urged in direction 152 with the armature 604, thereby opening the contacts 132, 134. The movement of the armature 604 in direction 152 is limited by an outer lip 610 on the armature 604 which contacts the yoke 603 when a determined separation between the armature 604 and end plate 601 has been reached.

In order to close the actuator, returning the actuator to the closed position of FIG. 8, the controller 116 energises coil 607 with an electric current adapted to generate the second magnetic field with a second polarity (opposite to the first polarity) to assist the magnetic field of the magnet 602. This causes the armature 604 to be attracted to end plate 601 with sufficient magnetic force to overcome the spring force of the opening spring 605. When armature 604 contacts the end plate 601 the magnetic force provided by the magnetic field of the magnet 602 alone is sufficient to hold the armature 604 in the closed position, and the electric current can be removed from the coil 607.

It will appreciated that by controlling the application of current to the coil 607, the controller 116 effectively controls the relative magnitude of the forces provided by the biasing mechanisms to thereby selectively move the contacts between the open and closed states. In this example the controller 116 is configured so that the contacts 132, 134 always return to the closed state autonomously, such that the switching apparatus is normally closed. In other words, the controller 116 ensures that the open states of the switching apparatus only occur transiently, and that the contacts 132, 134 always return to the closed state without external intervention.

The electric currents used to energise the coil 607 and subsequently enable the actuator 144 to open or close may be suitably provided by charged capacitors or by other means.

In one example, the electric current is provided by a charged capacitor, and the flow of electric current is selectively controlled by the controller 116. When the switching apparatus 100 determines a line overcurrent condition the controller 116 causes an electric current pulse to flow from the capacitor and through the coil 607 to generate the second magnetic field with the first polarity to oppose the magnetic field of the magnet 602, subsequently causing the actuator to move to the open position. After a predetermined period of time, the controller 116 causes an electric current pulse to flow from a capacitor through the coil 607 in a direction so that the second magnetic field has the second polarity that assists the magnetic field of the magnet, subsequently causing the actuator to return to the closed position.

A specific example of an embodiment of the switching apparatus 100, including the example magnetic actuator described above, will now be described with reference to FIGS. 10 to 12. Features similar to those of the example switching apparatus 100 described above with respect to FIG. 1 have been assigned correspondingly similar reference numerals, increased by 600.

Figure 10:
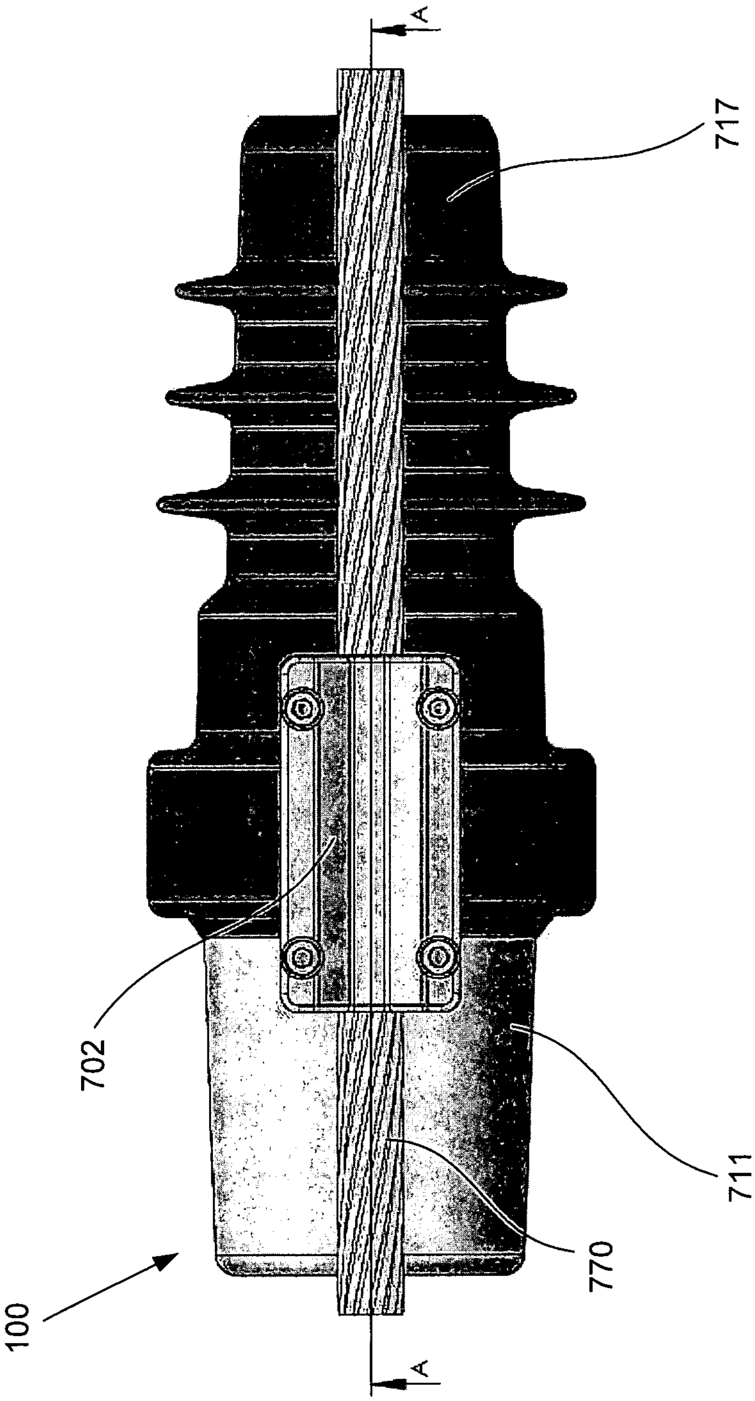
FIG. 10 is a top view of an example of an electrical switching apparatus.

Referring to FIG. 10, the switching apparatus 100 is integrated inside an enclosure which includes a first enclosure section 711 and a second enclosure section 717 which is made of insulating material. The switching apparatus 100 is removably attached to an electrical line 770 by a bracket 702 connected to the enclosure.

Figure 11:
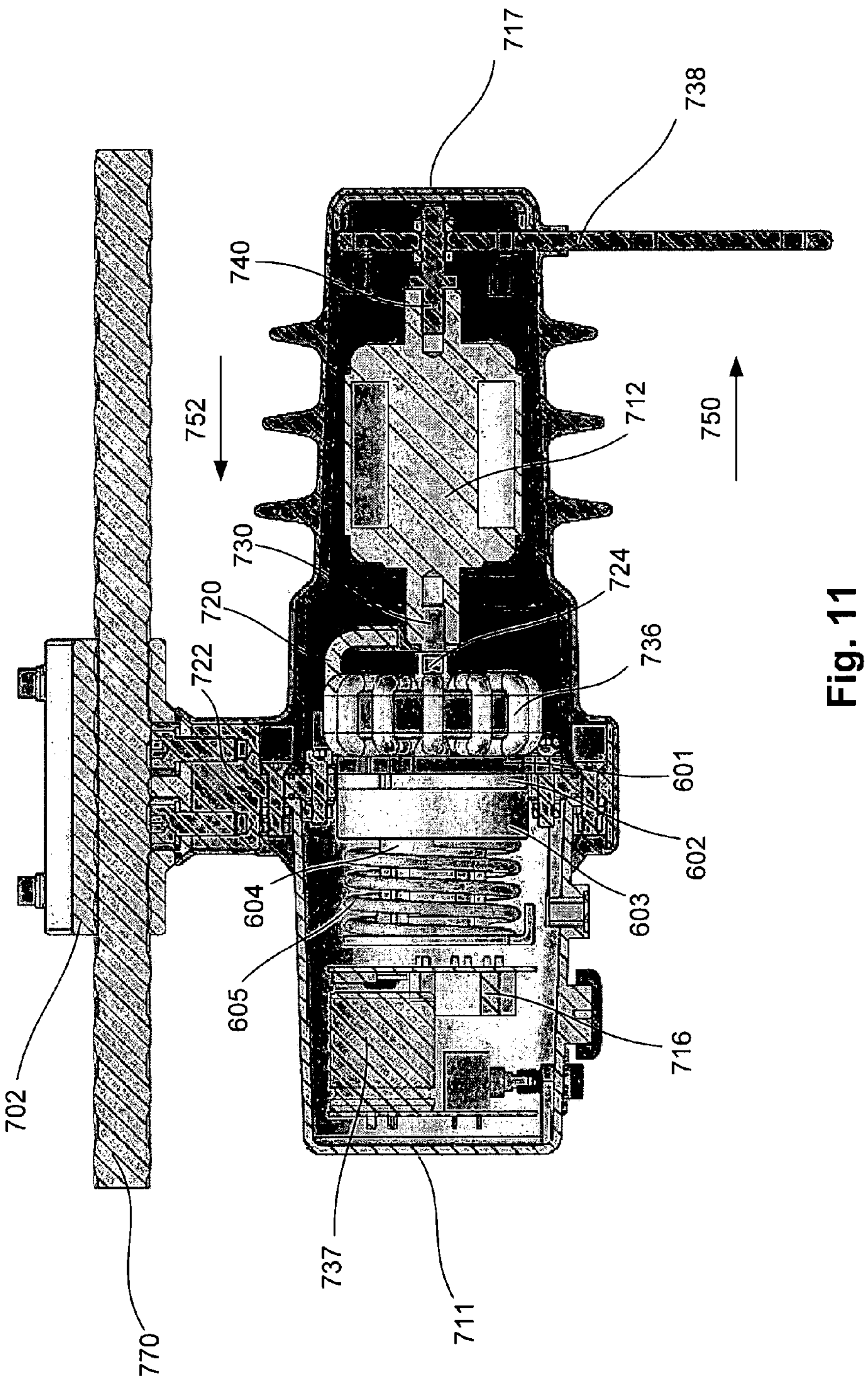
FIG. 11 is a cross-sectional front view of an example of an electrical switching apparatus, taken at line A-A of FIG. 10, showing the actuator in full; and, FIG. 12 is a cross-sectional schematic diagram of the electrical switching apparatus of FIGS. 10 and 11, showing the actuator in cross-section.

FIG. 11 shows a cross-sectional view of the switching apparatus of FIG. 10, and the internal components of the example embodiment of the switching apparatus 100 will now be described.

The bracket 702 includes a source terminal 722 connected to the line 770 which acts as the source 248 of electricity to the switching apparatus 100. The load terminal 738 exiting the switching apparatus 100 from the second enclosure section 717 may be connected to the fuse 246 which connects to the load 250, so that the switching apparatus 100 is connected in series with the fuse 246 between the source 248 and the load 250 as described above with reference to FIG. 2.

The source terminal 722 is electrically connected to the moving terminal 730 of the circuit interrupter 712 by a flexible conductor 720, and the moving terminal 730 is also mechanically coupled to the actuator 114 by the pushrod 724. The load terminal 738 is electrically connected to the fixed terminal 740 of the circuit interrupter 712. The circuit interrupter 712 includes contacts (not shown) that operate as per the contacts 132, 134 of the interrupter described above with reference to FIG. 1 and is therefore not described in further detail.

FIG. 11 shows the components of the actuator 114 as described above with reference to FIGS. 8 and 9, specifically the armature 604, opening spring 605, yoke 603, end plate 601, magnet 602. FIG. 12 shows a similar view to FIG. 11 but in this case the internal configuration of the actuator 114 can now be seen, revealing further internal detail of the aforementioned actuator components along with the components that are not externally visible, such as the contact spring 606 and coil 607.

As described in detail above with reference to FIG. 1, in use, the actuator 114 is normally in a closed position, biasing the pushrod 724 in the direction of arrow 750, closing the contacts 132, 134 and allowing current flow between the source and load terminals 722, 738, so that the switching apparatus 100 is in a closed state. When a line fault is sensed by the sensor 160, which is part of controller 716, the controller 716 activates the actuator 114 and the pushrod 724 is caused to move in the direction of arrow 752, separating the contacts of the circuit interrupter 712 and interrupting the current flow between the source and load terminals 722, 738, so that the switching apparatus 100 is in an open state.

In this example, the electric currents used to energise the coil 607 and subsequently enable the actuator 144 to open and close are provided by a capacitor 737. Alternatively separate capacitors can be employed for tripping and closing operations. In this way, the switching apparatus 100 can close at the end of the dead time without requiring a separate power source. Power to operate the electronic controller 716 during the dead time is provided by another capacitor (not shown) which is charged from current transformer 736.

The controller 716 is configured to ensure that prior to opening there is sufficient charge in the capacitor 737 to ensure the contacts will always be returned to a closed position, so that if the insufficient charge is available the contacts will remain closed, allowing the fuse to operate if required.

Figure 12:
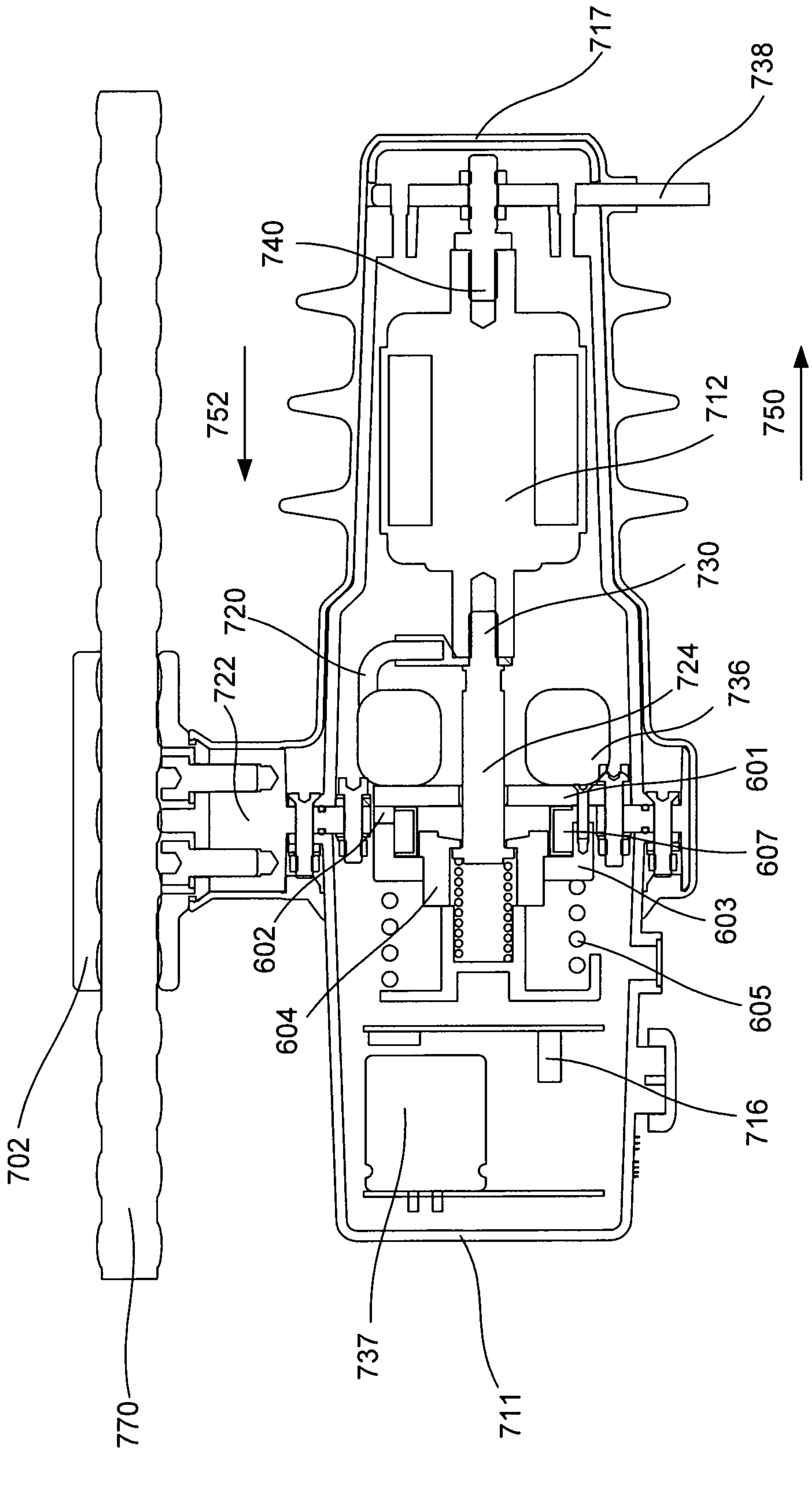

As discussed above with reference to FIGS. 8 and 9, the detailed example embodiment of the switching apparatus 100 shown in FIGS. 10 to 12 does not have a stable open state by virtue of the configuration of the controller 116. Accordingly, the switching apparatus 100 is arranged to have a normally closed configuration. However, it will be appreciated that numerous other arrangements of actuator or controller could be used to provide a switching apparatus having a normally closed configuration.

For example, the above arrangement has illustrated that the switching apparatus may be returned to the closed state by active input from the controller, but in other possible implementations this may be achieved passively. For example, alternative actuator implementations may exist in which current is only applied to the actuator by the controller to cause the transition to the open state, and stopping the current flow returns the contacts to the closed state without any active input from the controller. By arranging the switching apparatus in a normally closed configuration this allows the switching apparatus to be implemented in a simple compact manner allowing it to be provided cheaply and in a compact housing. This in turn allows the switching apparatus to be used in situations where previously fuses only were provided, thereby enhancing the reliability of the electricity supply network.

It will be appreciated that the above described examples provide certain benefits when compared to conventional switch gear apparatus.

For example, devices with a stable open state require a power supply with battery backup which is operating at all times even when the line is without power so that when a faulted line is energized the switching apparatus is able to trip. This is not required in the above described arrangements as the fuse will blow if the switching apparatus 100 does not open. This allows a simple line current self-powered device to be implemented without battery backup avoiding the need for periodic maintenance for the power supply battery.

An external indicator system is not required to show an operator if the device is open or closed. For example, if the switching apparatus 100 does not have a stable open state, the switching apparatus 100 will always close itself after a short delay. Similarly, this avoids the need to provide a method for allowing an operator to manually close or open the switching apparatus 100.

A complex insulation and surge protection system for electronics which is effectively at ground potential is not required for the invention as the electronics can be allowed to float at line potential. This allows the switching apparatus to be hung on an overhead distribution line without additional supports or insulation as illustrated in FIG. 10, 11, 12 or to be mounted on a grounded structure such as a cross-arm with a stand-off insulator.

An insulation system which provides a high impulse withstand across the interrupter for safety is not required as the switching apparatus is only open for brief time intervals whilst interrupting current, so that withstand is only required for the system transient recovery voltage which is lower than the required impulse withstand voltage.

An insulation system with can withstand continual electrical stress across the interrupter is not required as the switching apparatus is only open for brief time intervals whilst interrupting current, so that there is no requirement to withstand partial discharge, or to have long creepage distances in the insulation system across the interrupter.

A further benefit is that there are no parts which come into contact with an operator, thereby avoiding the need for a safety grounding or insulation of those parts.

The reduced complexity also allows the device to be small and light, allowing it to be optionally supported only by overhead lines without additional mounting and insulating means. It can also easily be installed with live line methods so that the line does not have to be de-energised and so reduces customer interruptions.

No periodic maintenance and no operator intervention is required for the lifetime of the device, so a utility technician never needs to visit the device once it is installed saving cost and allowing the device to be installed in locations with limited service access.

These benefits allow the switching apparatus to be used in situations where previously fuses only were provided, thereby enhancing the reliability of the electricity supply network.

It will be appreciated that the switching apparatus can be used in a wide range of situations, including, but not limited to poly-phase networks.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A switching apparatus for use in conjunction with a fuse, the switching apparatus including:

a circuit interrupter having a pair of separable contacts;

a sensor for sensing a line fault; and an actuator for moving the contacts to an open state when a line fault is sensed, and wherein the switching apparatus is arranged such that the contacts always return to a closed state after a first time period, said actuator will only open and close the contacts a single time after which the switching apparatus will not cause the actuator to move the contacts to the open state for a second time.

2. A switching apparatus according to claim 1, wherein the switching apparatus is arranged so that the actuator will only open and close the contacts a single time after which the switching apparatus will not cause the actuator to move the contacts to the open state whilst the line fault is still sensed.

3. A switching apparatus according to claim 1, wherein the contacts return to the dosed state autonomously.

4. A switching apparatus according to claim 1, wherein the contacts return to the closed state without external intervention.

5. A switching apparatus according to claim 1, wherein the switching apparatus includes only transient open states.

6. A switching apparatus according to claim 1, wherein the sensor is a current sensor and wherein a line fault is sensed if a line current rises above a predetermined level.

7. A switching apparatus according to claim 1, wherein the actuator is powered by a capacitor.

8. A switching apparatus according to claim 1, wherein the circuit interrupter is a vacuum interrupter.

9. A switching apparatus according to claim 1, wherein the actuator is for returning the contacts to the closed state.

10. A switching apparatus according to claim 1, wherein the switching apparatus includes a controller for controlling the actuator.

11. A switching apparatus according to claim 10, wherein the actuator includes:

a first biasing mechanism for biasing the contacts towards the closed state; and, a second biasing mechanism for biasing the contacts towards the open state; and wherein the controller is for selectively controlling at least one of the biasing mechanisms to thereby cause the contacts to move between the closed and open states.

12. A switching apparatus according to claim 11, wherein at least one of the biasing mechanisms includes at least one of:

a spring;

a resilient member; and a magnet.

13. A switching apparatus according to claim 12, wherein the first biasing mechanism includes a magnet for biasing the contacts towards the closed state, and wherein the second biasing mechanism includes a spring for biasing the contacts towards the open state.

14. A switching apparatus according to claim 13, wherein the actuator includes an armature coupled to one of the contacts for moving the contacts between the closed and open states.

15. A switching apparatus according to claim 14, wherein the actuator includes an electromagnet for modifying a magnetic attraction between the armature and the magnet, and wherein the controller is for selectively controlling a current applied to the electromagnet to thereby cause the contacts to move between the closed and open states.

16. A switching apparatus according to claim 11, wherein the first and second biasing mechanisms provide respective biasing forces in opposing directions, and wherein the controller controls the relative magnitude of the biasing forces to thereby selectively move the contacts between the open and closed positions.

17. A switching apparatus according to claim 1, wherein the actuator is an electromechanical escapement.

18. A switching apparatus for use in conjunction with a fuse, the switching apparatus comprising:

a circuit interrupter having a pair of separable contacts;

a sensor for sensing a line fault; and an actuator for moving the contacts to an open state when a line fault is sensed, and wherein the switching apparatus is arranged such that the contacts always return to a closed state, wherein the actuator is an electromechanical escapement containing:

a double-toothed pawl pivotally movable between first and second positions;

a spiral spring-loaded, single-toothed wheel mounted to an axle, to allow rotation of the wheel such that the tooth engages a first pawl tooth when the pawl is in the first position and a second pawl tooth, when the pawl is in the second position;

a crank having a first end coupled to one of the contacts and a second end pivotally mounted to the wheel such that the contacts are closed when the pawl is in the first position, and open when the pawl is in the second position;

a spring for biasing the pawl into the first position; and, a solenoid coupled to the pawl, wherein energizing the solenoid biases the pawl into the second position.

19. A switching apparatus according to claim 18, wherein the switching apparatus includes a controller for selectively energizing the solenoid to thereby cause the contacts to open.

20. A switching apparatus according to claim 18, wherein a number of times that the switching apparatus opens the contacts and returns the contacts to the closed state is based at least in part on the initial spring loading of the wheel.

21. A switching apparatus according to claim 10, wherein the controller is a programmable microprocessor.

22. A switching apparatus according to claim 1, wherein the sensor is a current transformer connected to the current path.

23. A switching apparatus according to claim 22, wherein at least the actuator is powered by the current transformer.

24. A switching apparatus according to claim 23, wherein, during the first time period, at least the actuator is powered by a capacitor charged by the current transformer.

25. A switching apparatus according to claim 21 wherein the controller is powered by a current transformer.

26. A switching apparatus according to claim 1, wherein the apparatus includes a circuit interrupter, actuator, controller, sensor and power supply integrated into an enclosure.

27. A switching apparatus according to claim 1, wherein the switching apparatus is placed in series with a fuse in use.

28. A switching system, comprising:

a switching apparatus including:

a circuit interrupter having a pair of separable contacts;

a sensor for sensing a line fault; and an actuator for moving the contacts to an open state when a line fault is sensed, and wherein the switching apparatus is arranged such that the contacts always return to a closed state after a first time period, said actuator will only open and close the contacts a single time after which the switching apparatus will not cause the actuator to move the contacts to the open state for a second time; and a fuse in series with the switching apparatus.

29. A switching apparatus for use in conjunction with a fuse, the switching apparatus including:

a circuit interrupter having a pair of separable contacts;

a sensor for sensing a line fault; and an actuator for moving the contacts to an open state when a line fault is sensed, and wherein the switching apparatus is arranged such that the contacts have no stable open state after a first time period, said actuator will only open and close the contacts a single time after which the switching apparatus will not cause the actuator to move the contacts to the open state for a second time.

* * * * *